(12) United States Patent
Steffens et al.

(10) Patent No.: US 9,533,713 B2
(45) Date of Patent: Jan. 3, 2017

(54) STRUCTURAL COMPONENT

(71) Applicant: Muhr und Bender KG, Attendorn (DE)

(72) Inventors: Hubertus Steffens, Drolshagen (DE); Christoph Hahn, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 14/822,926

(22) Filed: Aug. 11, 2015

(65) Prior Publication Data
US 2016/0046328 A1    Feb. 18, 2016

(30) Foreign Application Priority Data

Aug. 14, 2014 (DE) .......................... 10 2014 216 225

(51) Int. Cl.
| | |
|---|---|
| *B62D 25/04* | (2006.01) |
| *B21D 47/01* | (2006.01) |
| *B23K 15/00* | (2006.01) |
| *B62D 29/00* | (2006.01) |
| *C21D 1/18* | (2006.01) |

(52) U.S. Cl.
CPC ............. *B62D 25/04* (2013.01); *B21D 47/01* (2013.01); *B23K 15/0053* (2013.01); *B62D 29/008* (2013.01); *C21D 1/18* (2013.01)

(58) Field of Classification Search
CPC .................................................... B62D 25/04
USPC ..................................................... 296/193.06
See application file for complete search history.

(56) References Cited

U.S. PATENT DOCUMENTS

| | | | | |
|---|---|---|---|---|
| 6,204,469 | B1* | 3/2001 | Fields, Jr. ............ | B23K 26/032 219/121.6 |
| 6,279,990 | B1* | 8/2001 | Miyasaka ............ | B62D 25/025 296/193.06 |
| 2007/0063546 | A1* | 3/2007 | Lassl .................. | B62D 25/2036 296/193.06 |
| 2007/0278828 | A1* | 12/2007 | Anders .................. | B62D 25/04 296/193.06 |
| 2008/0000883 | A1* | 1/2008 | Rudolf .................. | B23K 9/167 219/121.64 |
| 2009/0280349 | A1* | 11/2009 | Bittendorfer .......... | B23K 26/26 428/594 |

(Continued)

FOREIGN PATENT DOCUMENTS

| | | | | |
|---|---|---|---|---|
| DE | 3600532 A1 * | 10/1986 | ............ | B21D 51/26 |
| DE | 4023393 C2 | 10/1992 | | |

(Continued)

*Primary Examiner* — H Gutman
(74) *Attorney, Agent, or Firm* — Bejin Bieneman PLC (57) ABSTRACT

The present invention relates to a structural component 1; 21; 31; 41, in particular for a motor vehicle body, comprising a cold-formed first formed part 2; 32; 42 and a warm-formed and hardened second formed part 3; 23; 33 with a variable thickness along a longitudinal extension $L_2$ of the second formed part 3; 23; 33, wherein the second formed part 3; 23; 33 has a connection portion 7; 27; 37 for being connected to the first formed part 2; 32; 42, wherein the connection portion 7; 27; 37 is distanced from an outer edge 13 of the first formed part 2; 32; 42 such, that the structural component 1; 21; 31; 41 has a one-layered flange portion 12 of the first formed part 2; 32; 42 between the connection portion 7; 27; 37 and the outer edge 13, and wherein the first formed part 2; 32; 42 and the second formed part 3; 23; 33 are connected to each other by means of a high energy beam welding seam 19 along a connection edge 18 of the connection portion 7; 17; 27. Furthermore, the present invention relates to a method for manufacturing a structural component 1; 21; 31; 41.

11 Claims, 4 Drawing Sheets

(56) References Cited

U.S. PATENT DOCUMENTS

| | | | | |
|---|---|---|---|---|
| 2013/0140851 A1* | 6/2013 | Zornack | ............... | B62D 21/157 296/193.06 |
| 2014/0003860 A1* | 1/2014 | Evangelista | ....... | B23K 26/3293 403/270 |
| 2014/0008938 A1* | 1/2014 | Busch | .................... | B62D 25/04 296/193.06 |
| 2014/0231395 A1* | 8/2014 | Brandt | .................. | B23K 26/26 219/74 |
| 2014/0271227 A1* | 9/2014 | Radomski | ............... | B23P 15/04 416/97 R |
| 2015/0030382 A1* | 1/2015 | Cretteur | ............. | B23K 35/3053 403/272 |
| 2015/0091327 A1* | 4/2015 | Kim | ......................... | B21B 1/12 296/187.03 |

FOREIGN PATENT DOCUMENTS

| | | | | |
|---|---|---|---|---|
| DE | 10048233 A1 | * | 4/2002 | ............. B23K 10/02 |
| DE | 102007003983 A1 | | 7/2008 | |
| DE | 10200803113 A1 | | 1/2010 | |
| DE | 102009022486 A1 | | 12/2010 | |
| DE | 102009040935 A1 | | 3/2011 | |
| DE | 102011120519 A1 | | 6/2013 | |
| EP | 1040984 A2 | | 10/2000 | |
| EP | 1205377 A1 | | 5/2002 | |
| EP | 0771605 B1 | | 11/2005 | |
| EP | 2754603 A1 | | 7/2014 | |
| GB | 1357526 A | * | 6/1974 | ............. F16C 33/60 |
| JP | 01132034 A | * | 5/1989 | |
| JP | 2002039245 A | * | 2/2002 | |
| WO | 2009112407 A1 | | 9/2009 | |

* cited by examiner

STRUCTURAL COMPONENT

RELATED APPLICATION

This application claims priority to German Patent Application No. 10 2014 216 225.4, filed on Aug. 14, 2014, which application is hereby incorporated herein by reference in its entirety.

BACKGROUND

From DE 10 2011 120 519 A1 a vehicle pillar for a motor vehicle is known, which has an inner skin made from a cold-formed sheet steel element and an outer skin made from a further formed sheet steel element. The inner skin has welding flanges extending in longitudinal direction of the vehicle pillar and which overlap with welding flanges of the outer skin. Between the two sheet steel elements further reinforcing and stiffening elements are provided. The on top of one another arranged welding flanges and projecting material portions of the reinforcing structure are connected to one another by spot welding connections or a laser welding connection.

SUMMARY

The present disclosure relates to a structural component, e.g., for a motor vehicle body, and a method for manufacturing a structural component. The structural component, can be connected in a simple manner to further components and has a low weight. A method is disclosed by which a corresponding structural component can be produced.

A structural component in the present context can include a cold-formed first formed part, and a warm-formed and hardened second formed part with a variable thickness along a longitudinal extension of the second formed part, wherein the second formed part has a connection portion for connecting to the first formed part, wherein the connection portion of the second formed part is distanced from an outer edge of the first formed part, such that the structural component has a one-layered flange portion of the first part between the connection portion and the outer edge, and wherein the first formed part and the second formed part are connected to each other by a high energy beam welding seam along a connection edge of the connection portion.

A connection edge of the second formed part is off-set, i.e., distanced, relative to an outer edge of the first formed part, so that the first formed part forms a one-layered flange portion of the structural component. In a cross-section, the structural component has exactly one flange layer that can also be referred to as single layered flange portion. In other words, due to the one-layered, respectively single-layered flange portion, the structural component has an area in which the first formed part and the second formed part do not overlap each other, i.e., do not cover each other. Said single layered portion can be used for being connected to a further component and may also be designated as a welding flange. Thus, the structural component is especially suitable for being welded to further components, for example, an outer skin of a motor vehicle, since only the material properties and thickness of the first formed part has an influence on the connection to the further component, but not the second formed part.

Because of the one-layered flange portion, only the cold-formed first formed part has to be welded or connected in other ways to the further components without any potential interaction of the second formed part. Furthermore, the first formed part is cold-formed and can thus be well welded in comparison to the hardened second formed part. Furthermore, because of the off-set of the connection edge of the second formed part in relation to the outer edge of the first formed part, the high energy beam welding seam, in short the welding seam, can be laterally produced so that a strong connection is achieved between the first and the second formed part. Furthermore, because of the off-set of the connection edge of the second formed part in relation to the first formed part, a doubling of the material by an overlaying of the second formed part over the flange portion of the first formed part is prevented, so that weight is directly saved on the second formed part and in total a lighter structural component is provided.

Furthermore, due to the sheet thickness varying along the longitudinal extension of the second formed part, the second formed part can be locally adapted to the respective loading cases. Thus, less strongly loaded partial areas of the second formed part or of the structural component can have a smaller thickness, whereby the use of material of the second formed part is reduced and in total the weight of the structural component is reduced. Conversely particularly strongly loaded partial areas of the second formed part, i.e., of the structural component, can be formed thicker and thus more stable.

In the description and in the claims the singular and the indefinite article are used for better readability; unless stated otherwise or the contrary is clear from context, these also encompass the plural of these elements. This especially means that the structural component can have at least one flange portion, at least one outer edge, at least one connection portion, at least one connection edge, at least one welding seam and further formed parts.

The first formed part is a cold-formed component made form a metal material, which preferably is made from a sheet steel, having a thickness that is a fraction of an extension in longitudinal or transversal direction of the component. By the cold-forming process it is meant the forming of metals at a temperature distinctly below its recrystallization temperature. A cold-rolled, microalloyed sheet steel, for example HC 420 LA+, can be used as a steel material. The steel material can comprise a coating, for example a zinc coating, especially ZE 75/75.

The second formed part is a warm-formed and hardened component made from a metal material. Warm-forming in the present disclosure means in particular the forming of metals above their recrystallization temperature. The hardened second formed part is preferably a formed part from a sheet steel, having a thickness that is a fraction of an extension in longitudinal or transversal direction of the component. In one embodiment, boron steel, for example, 22MnB5, can be used as steel material, wherein any other hardenable steel material can also be considered. The second formed part can be coated, especially with an aluminum-silicon-alloy or zinc, to prevent a scaling of the component during the warm-forming or to serve as corrosion protection of the second formed part. In this case, the second formed part can be coated before and/or after the warm-forming. If the coating is provided before the warm-forming, the strip material, from which the second blank is produced, or the blank itself, can be coated. If the coating is provided after the warm-forming the formed and perhaps already hardened second formed part can be coated. The second formed part is either hardened after the warm-forming or it is hardened during the warm-forming at least in partial areas, preferably completely. The warm-forming and hardening can be carried out for example in a press-hardening tool in one process step. This combined forming and hardening process is also designated as press-hardening. According to an exemplary embodiment, the second formed part can be manufactured from a blank, which is heated before the warm-forming at least up to 800° to 850° Celsius, is then quickly put into the forming tool and formed in the warm condition, thereby being quickly cooled down because of contacting the forming tool. The forming tool can be cooled from the inside in a forced manner. The cooling of the formed part can take place for example within approximately 15 seconds or less in a defined manner down to for example approximately 200° Celsius. Besides the above described press-hardening the second formed part may also be hardened differently in a manner known.

Besides the second formed part also the first formed part can have partial areas with varying sheet thickness, which can also be manufactured for example by flexible rolling of strip material or by connecting several components of different sheet thickness to each other. Blanks with varying sheet thickness produced by flexible rolling, are also referred to as Tailor Rolled Blanks. Blanks, which are put together and welded to each other from several partial blanks with different thickness, are also called Tailor Welded Blanks. In principle the first as well as the second formed part can be made up from different materials; important is, that these have at least a metallic partial area, which is formed to form a three-dimensioned structure. The components are also characterised as formed parts.

According to one aspect of the present disclosure the structural component has exactly the two formed parts, namely the cold-formed first formed part, and the warm-formed and hardened second formed part. Advantageously, the first formed part forms an inner part of the structural component and the second formed part forms an outer part of the structural component. A respective outer face arranged at the outside of the structural component is freely accessible.

The flange portion can have a transversal extension of more than 20 millimeters along at least 50% of a longitudinal extension of the first formed part. In other words, a distance between the connection edge between the first and second formed part and the outer edge of the first formed part is more than 20 millimeters at least along 50% of the longitudinal extension of the first formed part. Preferably, the flange portion is wider than 20 millimeters along more or less the whole length of the first formed part, i.e., along at least 90% of the longitudinal extension of the first formed part. Because of such a wide flange portion the first formed part offers a sufficient wide welding flange, to connect the structural component along the flange portion to a further component. Said further component, which does not belong to the structural component, can be for example an outer skin, e.g., envelope of a motor vehicle.

Furthermore, the connection portion can have a width of less than 10 millimeters in a cross-sectional view through the structural component. The connection portion can have said narrow width along at least the largest part of the length of the second formed part. Furthermore, the flange portion of the first formed part can extend along at least 50% of a longitudinal extension of the first formed part. In addition or as an alternative, the connection portion can extend at least 50% of a longitudinal extension of the second formed part. The flange portion and the connection portion may also have at least approximately the same length and extend along the abutting longitudinal portion between the first and the second formed part. In this manner the first and the second formed part can be connected to each other along a long longitudinal portion by a high energy welding seam. Advantageously, the welding seam, in contrast to the resistance spot welding method, does not have to be welded through the sheets of the first and the second formed part, but the high energy welding seam is arranged on the first formed part along the connection edge of the second formed part. Thus, the connection portion can be formed to be especially narrow, whereby weight is saved.

In an example the high energy beam welding seam is formed continuously along a least 50% of an edge length of the connection edge. Thus, in contrast to an only partial spot welding, a very stable connection is provided between the first and the second formed part. According to the present disclosure, a continuous welding seam is not only limited to a continuous welding seam in a literal sense, but is explicitly also meant to include a stitching seam, in which neighbouring welding spots may overlap each other.

Further, the connection portion of the second formed part can enclose an angle of 1° to 90° with the first formed part. In other words, the connection portion of the second formed part can be arranged inclined or at a right angle on the first formed part. In this manner the two formed parts abut each other at least in the area of the connection portion only along the connection edge. Thus an especially narrow connection portion can be provided, thereby contributing to a light second formed part, an overall light structural component resulting therefrom. Because of the narrow connection portion, an overlapping of different sheet thicknesses of the first and the second formed part is prevented, so that the two formed parts can be connected more easily. In the case of sheet thickness variations of the second formed part, which can be necessary for specific applications or market specific requirements with regard to the strength of the structural component, the first formed part does not have to correspondingly be adapted locally because of the narrow connection portion. Thus, the first formed part, for example an inner panel of a B-pillar of a motor vehicle which is also called a closing panel, can have always the same dimensions and only the second formed part, for example an outer panel of a B-pillar, can be adapted to the respective application and market specific requirements. Furthermore, it is advantageous that because of the inclined arrangement of the connection portion on the first formed part behind the welding seam, a chamber, which widens, is formed, which can serve for the venting a metal vapor exiting during the high energy beam welding process.

Further, the connection portion of the second formed part may be formed in the shape of a tab which engages in a slot formed in the first formed part. In this manner an insertion connection is provided, which additionally reinforces the connection between the first and the second formed part. More particularly, several of the connection portions can be provided in the shape of tabs which are welded to the first formed part, wherein between two neighboring tabs a non-welded intermediate portion can be formed. For example, several of said slots can be provided one after the other in one or more rows in longitudinal extension of the first formed part, into which the tabs of the second formed part can be inserted. The tabs may be integrally formed with the second formed part and may also be referred to as bracket portion.

Furthermore, the second formed part can be formed, when seen in cross-section, along at least 80% of a longitudinal extension of the first formed part narrower than the first formed part. In other words, the width of the second formed part is smaller than the width of the first formed part, at least along most part of the length or substantially the entire length of the component. The second formed part that may be formed in the shape of a hat outline, or U-like, can be mounted to the first formed part that may be formed at least essentially flat. Thus, the second formed part has two connection edges extending in longitudinal direction of the second formed part which are set backwards relative to the two outer edges of the first formed part.

The structural component can be a vehicle pillar of a motor vehicle, especially an A-, B- or C-pillar. The first formed part can thus be an inner part of the vehicle pillar, i.e., a closing panel, also called an inner panel or an A-, B- or C-pillar inners, and the second formed part can be an outer part of the vehicle pillar, also called outer panel or A-, B- or C-pillar outers. The vehicle pillars are connected in the common manner to an outer skin or envelope, which represents the outer visible body panel. This outer skin is only connected to the flange portion of the closing panel, i.e., of the first formed part. The outer vehicle pillar, i.e., the second formed part, are not connected to the outer skin.

According to an embodiment, only the outer part of the vehicle pillar has a variable thickness along its longitudinal extension to form respective reinforced areas and weakened areas or softened areas for influencing the crash behavior of the vehicle pillar in a targeted manner. In this manner a standardized closing panel can be provided that has a constant thickness across the markets. However, it is to be understood that the closing panel can also have a variable thickness along its longitudinal extension to reinforce partial areas of the vehicle pillar additionally to the outer vehicle pillar.

A method for manufacturing a structural component, in particular for a motor vehicle body comprises cold-forming a first blank to a first formed part; producing a second blank with a variable thickness along a longitudinal extension of the second blank; warm-forming the second blank to a second formed part with a connection portion for being connected to the first formed part; hardening the second formed part; putting the second part onto the first formed part such that a connection edge of the second part abutting the first formed part is distanced from an outer edge of the first formed part; connecting the second formed part to the first formed part by a high energy beam welding seam, extending along the connection edge, produced with a high energy beam welding method.

Advantageously, because of the high energy beam welding in comparison to other welding methods, less thermal energy is entered and more concentrated into the formed parts to be connected with each other. Thus, a warping, caused thermally, is distinctively less compared with resistance spot welding. Furthermore, during the high energy beam welding method only a single-sided access to the formed parts to be welded to each other is necessary. In contrast thereto, during a resistance spot welding method, an access from both sides has to be provided, to be able to move the welding electrodes from both sides towards the formed parts. Because of the off-set of the connection edge of the second formed part relative to the outer edge of the first formed part, the connection edge is well laterally accessible, i.e., generally visible, so that the use of high energy beam welding methods is simplified. As high energy beam welding methods, besides the arc and electron beam welding methods, especially the laser beam welding method is suitable, wherein the selected welding method can be carried out with or without additional material.

The second blank can be manufactured according to a first possibility from a flexibly rolled strip material. By the flexible rolling of the second blank, the second formed part receives a variable sheet thickness along its longitudinal extension. In this manner, strongly loaded partial areas, which for example should not buckle during a side crash, can be formed thicker. The flexible rolling enables furthermore that less loaded partial areas or such which should buckle during an external loading, can be formed weaker, i.e., thinner. In this manner the thickness of the second formed part can be changed along its longitudinal direction in a targeted manner and thus, the weight of the component is reduced.

According to a second possibility the second blank can be manufactured also by welding several partial blanks with different sheet thicknesses to each other. Such blanks are also called "Tailor Welded Blanks".

By the manufacturing method according to the disclosure the same advantages are achieved as they are described in connection with the structural component according to the disclosure so that in this case it can be referred to the above description for abbreviation. In this case it is obvious, that all named embodiments of the device are transferable to the method and vice versa.

To produce an especially stable connection between the first and the second formed part, the high energy beam welding seam can be produced along at least 50% of an edge length of the connection edge. In this case, a continuous or interrupted weld can be produced. The welding seam, which can be adapted to the loading of the formed parts, is more stable than resistant welded spots. Advantageously, the high energy beam welding seam is formed continuously along at least 50% of the length of the connection edge.

Further, before the step of cold-forming the first blank and/or of the warm-forming of the second blank, at least one of the following steps can be provided: surface coating of the first blank; surface coating of the second blank. The first blank can, for example, be coated with zinc and the second blank can be coated with aluminum-silicon. Besides the corrosion protection, which offer the two coatings, especially the aluminum-silicon-coating is suitable for preventing scaling of the second formed part during the warm-forming. It is an advantage that the formed parts do not have to be coated anymore after the forming and especially after the connecting step. Thus, the manufacturing process is optimized.

Preferably before the step of connecting the formed parts with each other, all through-openings can be worked into the structural components. The first formed part can be pierced after the forming process, as the first blank can bulge strongly during the cold-forming process. Alternatively or additionally, the through-openings can also be pierced before the cold-forming process, if the constructively pre-determined tolerance ranges of the through-openings enable this correspondingly. The through-openings of the second formed part are advantageously produced before the hardening, especially before the press-hardening into the second blank, as the piercing of the through-openings into the hardened material causes an increased expenditure. However, the through holes can be cut, for example, by a laser beam cutting method into the hardened second formed part, if necessary. The through holes can already be produced before warm-forming of the second blank, as the second blank does not greatly bulge during the warm-forming.

During the warm-forming feeding flanges may be produced. The feeding flanges may be formed as bent edge portions of the second formed part which may have a hat-shaped cross-section, for example. The feeding tabs can subsequently at least partially be cut, especially such that the feeding flange has a transversal extension of less than 10 millimeters. Thus, the at least one cut feeding flange can be used as the connection portion for connecting to the second formed part to the first formed part.

Furthermore, the feeding flange can also be completely cut off before the connection. Thus, the second formed part can abut the first formed part so as to include an angle with the first formed part. In this manner the second formed part abuts the first formed part only along the connection edge, so that the connection portion is only as wide as the welding seam. Thus, an overlapping portion is reduced to a minimum between the connection portion and the second formed part.

To reinforce the connection between the connection portion and the first formed part, the feeding flange can be completely cut off and/or the second formed part can be cut such that at least a tab is produced. In the first formed part, a slot, which corresponds to the tab, can be produced, into which the tab is inserted when putting the second formed part onto the first formed part. Several of the slots can be produced on the first formed part and several corresponding tabs can be produced on the second formed part and inserted therein.

For the step of a formed part, forming rectangular blanks or profile cut parts produced from a strip material can be used. For manufacturing the first formed part, the strip material can initially be flexibly rolled analogously to the second formed part. The first blank can be cut from this strip material, so that the first blank, like the second blank, has a variable thickness along its longitudinal extension. The first blank can then be formed in a cold-forming step to the first formed part. The second blank is initially heated to an austenisation temperature, for example 800° to 850° Celsius, and can then be warm-formed to the second formed part. The second blank can be press-hardened during the warm-forming step, such that the second blank is not only warm-formed in a forming tool having a die and a punch, but is also quenched by a cooling device integrated into the forming tool below a critical cooling velocity. For example, the formed part can be cooled within, for example, 15 seconds to a temperature of less than 200° Celsius so that it is hardened. Besides the press-hardening process, the second formed part can also be hardened in other ways at least in partial areas, or totally.

SUMMARY OF THE DRAWINGS

Example embodiments are described in the following using the drawings.

DETAILED DESCRIPTION

Figure 1:
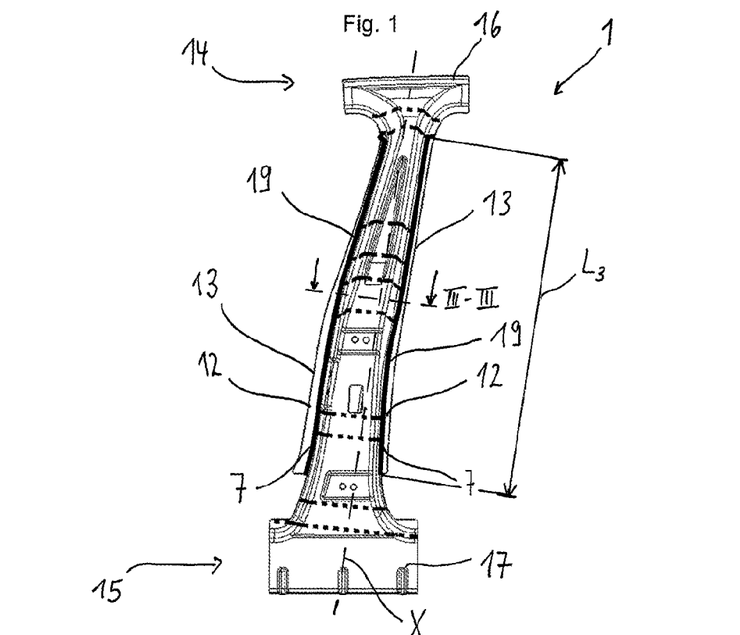
FIG. 1 illustrates a B-pillar according to a first embodiment in a side view.

In FIG. 1 a structural component 1 is shown formed as a vehicle pillar, in this case a B-pillar, of a motor vehicle. As is known, the B-pillar 1 serves for connecting a roof frame with a sill of the vehicle body. In a crash the B-pillar, as well as other vehicle pillars, fulfill a safety function, as they stabilize a passenger compartment, not shown, against deformation and absorb forces during a side crash.

Figure 2:
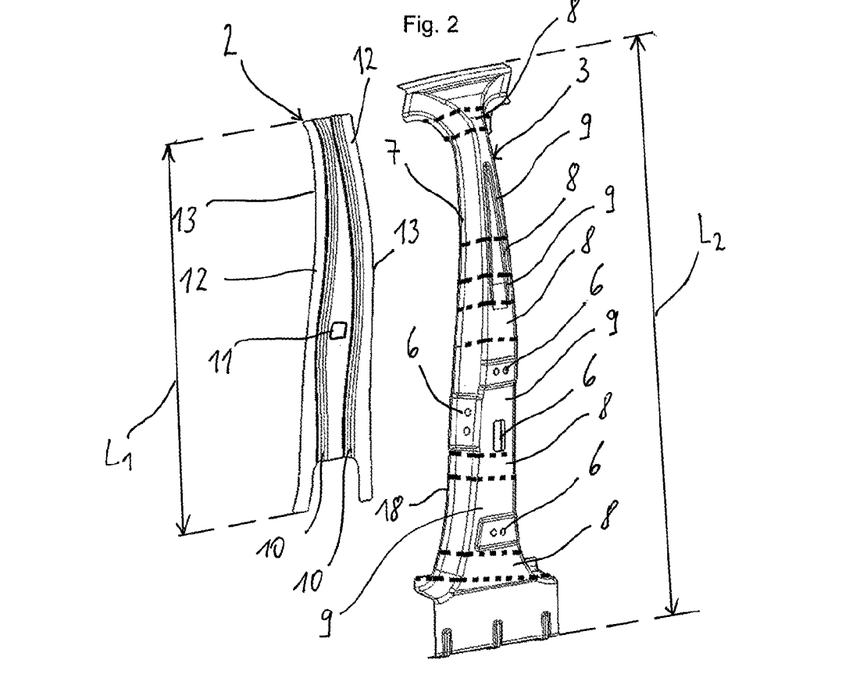
FIG. 2 illustrates the B-pillar of FIG. 1 in a perspective exploded view.

In FIG. 2 the vehicle pillar 1 is shown in an exploded view. The vehicle pillar is formed in two parts and has a first formed part 2, which is also referred to as the closing panel or inner panel of a B-pillar 1, and a second formed part 3, which is an outer panel of the B-pillar 1.

The first formed part 2 is a cold-formed part, which has a constant thickness along its length and width. For manufacturing the first formed part 2 a steel sheet is rolled. As steel material a cold-rolled, microalloyed sheet steel, namely HC 420 LA+, can be used, which is provided before the cold-forming with a zinc coating on both sides. From this coated strip material a first blank is worked, which is then cold-formed to the first formed part 2. Cold-forming is understood to be the deforming of metals at a temperature distinctly below the recrystallization temperature of the here used sheet steel, in this case at room temperature.

Figure 4:
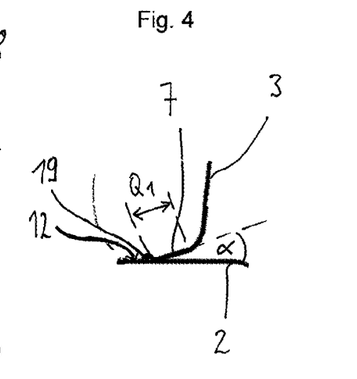
FIG. 4 is an enlarged detail view of the B-pillar shown in FIG. 3.

The second formed part 3 is a warm-formed and hardened formed part. For manufacturing the second formed part 3, initially a strip material, in this case for example a 22MnB5 steel sheet, can be provided with an aluminum-silicon-coating and can be flexibly rolled. The flexibly rolled sheet steel is also referred to as a "Tailor Rolled Blank". From this coated strip material a second blank is worked so that the second blank has a variable thickness along its longitudinal extension. Before the warm-forming of the second blank, through-openings 6 for a closing wedge of a front door or for the attachment of a rear door are formed in the second blank. Generally the through-openings 6 can also be formed in the warm-formed and hardened formed part 3 by a laser beam cutting method. Subsequently, the second blank is warm-formed, wherein the warm-forming is understood to be the deforming of metals above the recrystallization temperature of the steel used, here of 22MnB5. More particular, for the step of warm-forming, the second blank is initially heated to between 800° and 850° Celsius, and is then warm-formed to the second formed part 3. During the warm forming the second blank is press-hardened, such that it is not only warm-formed in a forming tool having a die and a plunger, but also is quenched by a cooling device integrated in the forming tool. The cooling takes place below the critical cooling speed, for example within approximately 15 seconds to a body temperature of below 200° Celsius. During the step of the warm-forming, feeding flanges, bent to the outside on the second formed part 3, are produced, which after the press-hardening are cut such that the remaining flange portion has a width $Q_1$ of approximately 10 millimeters or less. The cut flanges serve as connection portions 7 for connecting the second formed part 3 to the first formed part 2. In FIG. 4 it can be seen that the width $Q_1$ of the bent connection portions 7 is determined by the radius free side end portions of the second formed part 3, i.e., the connection portions 7 are formed straight. The width $Q_1$ of the bent connection portions 7 can be for example 10 millimeters.

Furthermore, the precise structure of the vehicle pillar 1 is described in detail with reference to FIGS. 1 to 4. The cold formed first formed part 2 has an elongated, two-dimensional base shape with two bulgings 10 extending along the longitudinal direction X. In the first formed part 2 several through-openings 10, which, for example, serve for passing electric cables or other vehicle components through, are formed after the cold-forming. At the edge two flange portions 12 with outer edges 13 extending substantially in longitudinal direction X are provided, wherein the flange portions 12 can be welded to further vehicle components, not shown, for example an outer skin or envelope of the vehicle. For improving the welding suitability, the two flange portions 12 can be selectively softened by heating, for example by electric resistance heating.

The press-hardened second formed part 3 has several partial portions 8, 9 with different sheet thickness in longitudinal direction X of the second formed part 3, i.e., in longitudinal direction X of the vehicle pillar 1, said portions 8, 9 are indicated in FIGS. 1 and 2 by the dashed lines. More particularly, the reinforced partial portions 8 have larger sheet thicknesses than the thinner partial portions 9. Several thicker partial portions 8 and thinner partial portions are provided. Between each thick partial portion 8 and an adjoining thinner partial portion, transitional portions are also provided, in which a continuous sheet thickness transition from one partial portion with a thicker sheet to a partial portion with a thinner sheet takes place. Furthermore, the second formed part 3 has an elongated base shape with a hat-contour, or U-shaped, cross-section. At an upper and a lower end portion 14, 15, respectively, a welding flange 16, 17 is provided, by which the second formed part 3 can be connected to the vehicle roof frame or the sill of the motor vehicle.

Figure 3:
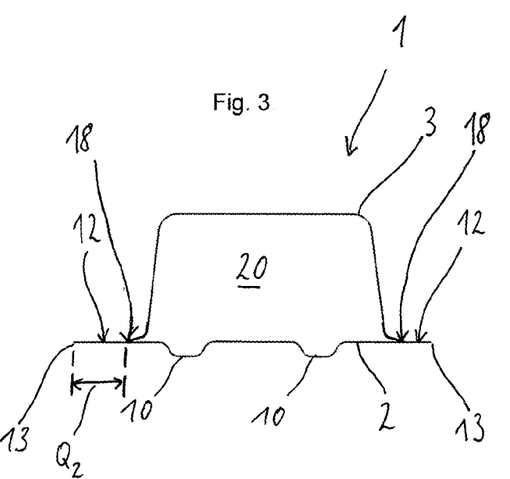
FIG. 3 illustrates the B-pillar in a schematical cross-sectional view along the intersecting line III-III shown in FIG. 1.

FIG. 3 shows a cross-section of the vehicle pillar 1 along the intersecting line III-III shown in FIG. 1. It can be seen that the second formed part 3 is formed in the cross-sectional view narrower than the first formed part 2. The hat-contour-shaped second formed part 3 together with the two connection portions 7 bent from the second formed part 2 and which were manufactured by cutting the feeding flanges produced by the warm-forming, is supported on the first formed part 2. By the inclined arrangement of the two connection portions 7 to the first formed part 2, the two formed parts 2, 3 abut each other along two connection edges 18, extending substantially in longitudinal direction X. The connection edges 18 are set back in relation to the outer edges 13 of the first formed part 2, so that the flange portions 12 of the first formed part 2 are made accessible, i.e., are not covered by the second formed part 3. Thus, the vehicle pillar 1 is formed as a single layer part along the flange portions 12. The flange portions 12 extend along the whole longitudinal extension $L_1$ of the first formed part 2 and have a transversal extension $Q_2$ of more than 20 millimeters. Said transversal extension $Q_2$ extends across approximately 90% of the longitudinal extension $L_1$ of the pillar 1. To connect the vehicle pillar 1 to the further vehicle components, for example the outer skin of the vehicle, thus, only the first formed part 2 has to be connected to the outer skin along the flange portions 12. Connecting the flange portions to the vehicle skin can be effected by welding or other suitable technique.

The two formed parts 2, 3 can be connected along the two connection edges 18 on the first formed part 2 by laser beam welding with respectively one continuous high energy welding seam 19. The welding seam 19 can extend along the whole edge length L3 of the respective connection edge 18. Because of the inclined arrangement of the two connection portions 7 on the first formed part 2 an angle α of, for example, approximately 15° is enclosed between the connection portions 7 and the first formed part 2, so that an inner chamber 20, opening to the inner of the vehicle pillar 1, is formed. The inner chamber 20 serves for venting metal gases produced during the welding process. The metal gases can escape at that point of time, in which the vehicle pillar 1 is still not connected to the vehicle body at the upper and the lower end portion 14, 15.

An advantage is that the first and the second formed part 2, 3 only slightly overlap each other because of the narrow connection portions 7, so that the varying sheet thicknesses of the thick and thin partial portions 8, 9 of the second formed part 3 do not have to correspond to the sheet thickness of the first formed part 2. Thus, the planning and manufacturing process for the vehicle pillar 1 and the welding process is simplified. Thus, the first formed part 2 can be a standardized closing panel, which has uniformly one sheet thickness across the markets. Then only the second formed part 3 has to be adapted to the application and market-specific requirements concerning the crash protection, such that specific partial portions of the second formed 3 are reinforced in a targeted manner by increasing the sheet thickness. For additional reinforcement of specific partial portions of the vehicle pillar 1 it would also be possible to attach at least one reinforcement panel at the inside on the second formed part 3 and/or the first formed part 2. The reinforcement panel can be a further warm-formed formed part for example, which however, does not overlap the flange portions 12.

Figure 5:
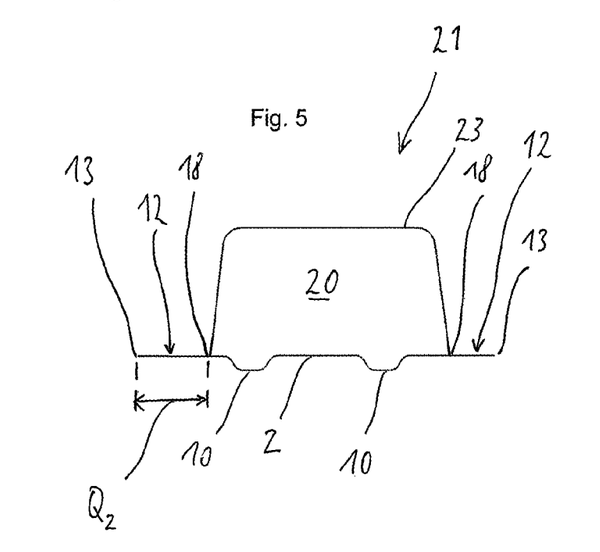
FIG. 5 illustrates a B-pillar according to a second embodiment in a schematical cross-sectional view.

In FIG. 5 a cross-sectional view of a vehicle pillar 21 according to a second embodiment is shown. Components which correspond to components of the first embodiment are provided with the same reference numerals as in FIGS. 1 to 4.

The vehicle pillar 21 according to the second embodiment differs from the vehicle pillar 1 according to the first embodiment shown in FIGS. 1 to 4, only by an alternative second formed part 23.

Figure 6:
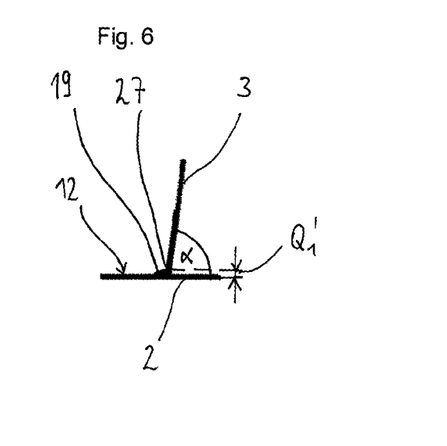
FIG. 6 illustrates an enlarged detailed view of the B-pillar shown in FIG. 5.

During the step of the warm-forming of the second formed part 23, feeding flanges are also produced, which however are completely cut off after the press-hardening. In this manner the second formed part 23 receives a U-like base shape in a cross-sectional view with two connection portions 27. In FIG. 6 it can be seen that a width $Q_{1'}$ of the connection portions 27 is limited to the width of the high energy welding seams 19, so that the width $Q_{1'}$ of the connection portions 27 is less than 2 millimeters. The second formed part 23 is thus arranged relative to the first formed part 2 in abutment at an angle α of approximately 80° and is connected along the two connection edges 18 to the first formed part 2 by laser beam welding. By this inclined arrangement again the inner chamber 20 opening to the inner of the vehicle pillar 1 serves for venting the metal gases produced during the welding process.

Figure 7:
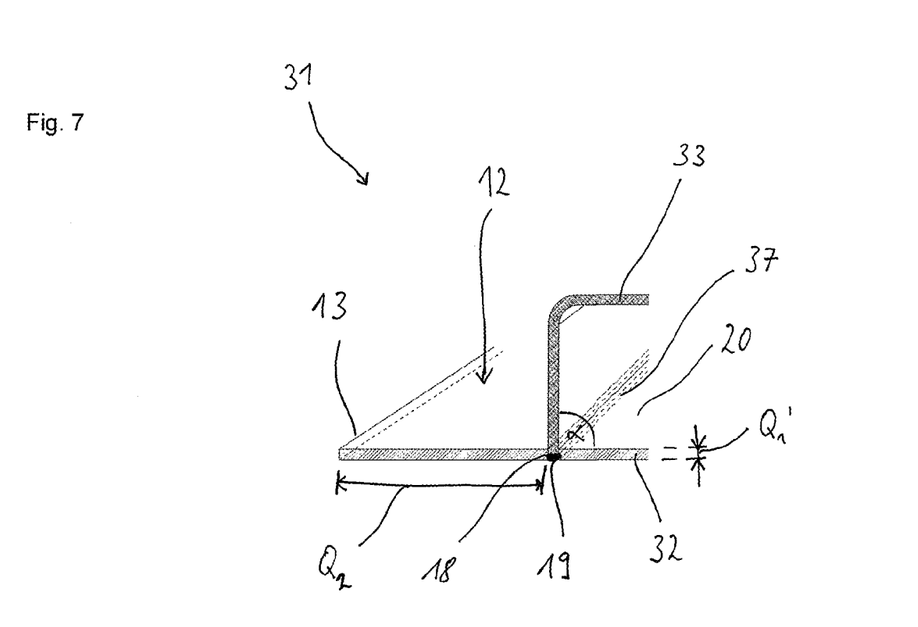
FIG. 7 illustrates a part of a B-pillar according to a third embodiment in a cross-section in a three dimensional view.

In FIG. 7 a cross-sectional view of a part of a vehicle pillar 31 according to a third embodiment of the present disclosure is shown. Components, which correspond to components of the first embodiment, are provided with the same reference numerals as in FIGS. 1 to 4.

Figure 8:
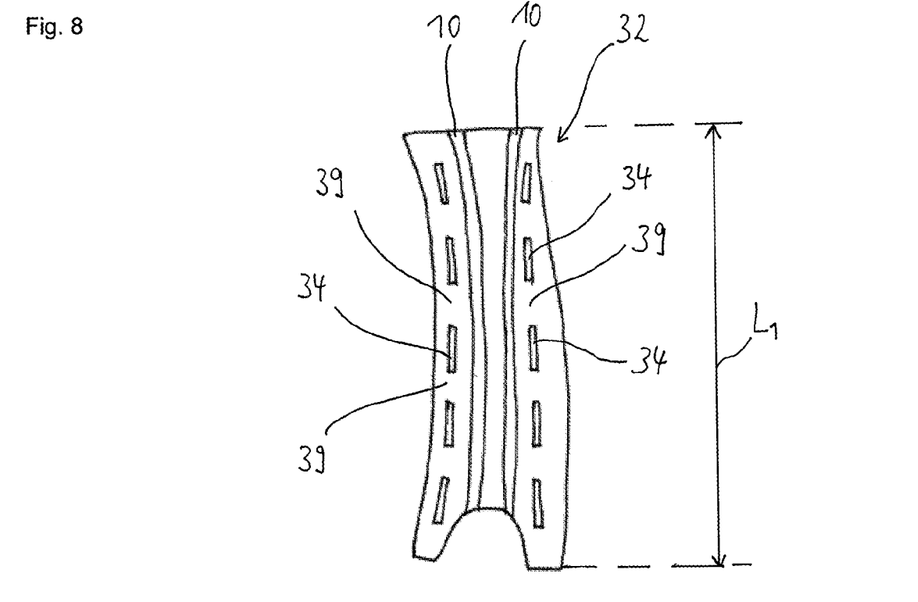
FIG. 8 illustrates a first formed part of the B-pillar shown in FIG. 7 in a top view.

The vehicle pillar 31 according to the third embodiment differs from the vehicle pillar 1 according to the first embodiment shown in FIGS. 1 to 3, in that a first formed part 32 has several slots 34, which interact with a respective second formed part 33. In FIG. 8 a simplified top view of a detail of the first formed part 32 is shown, in which it can be seen that the slots 34 are arranged distanced from each other in two rows and extend substantially in the longitudinal direction X.

Furthermore, the vehicle pillar 31 of the third embodiment differs from the vehicle pillar 1 according to the first embodiment shown in FIGS. 1 to 3, such that the second formed part 33 has several tabs 37, which are inserted into the slots 34 in the condition shown in FIG. 5. The tabs 37 form several connection portions of the second formed part 33, which are produced after the press-hardening of the second formed part 33. In practice, during the step of warm-forming the second formed part 23, feeding flanges also are produced, which are completely cut off after the press-hardening. Thus, the second formed part 33 receives a U-like base shape in a cross-section. Afterwards connection portions in shape of tabs 37 are cut from the two legs 38 of the second formed part 33 by a laser beam cutting method.

After producing the tabs 37, these are inserted into the slots 34 by putting the second formed part 33 onto the first formed part 32, and are welded from a lower side of the first formed part 32 arranged opposite to the second formed part 33, along the tabs 38. Thus, several high energy welding seams 19 limited to the tabs 37 are produced, wherein between two neighboring tabs 37 non-welded intermediate portions 39 are formed. By the arrangement of the second formed part 33 in abutment to the first formed part 32, an angle α of approximately 90° is enclosed between the first and the second formed part 32, 33, so that the inner chamber 20 opening to the inner of the vehicle pillar 1 serves for venting metal gases produced during the welding process. It is understood however that the angle α enclosed between the first and second formed parts 32, 33 can also be smaller than 90°.

Figure 9:
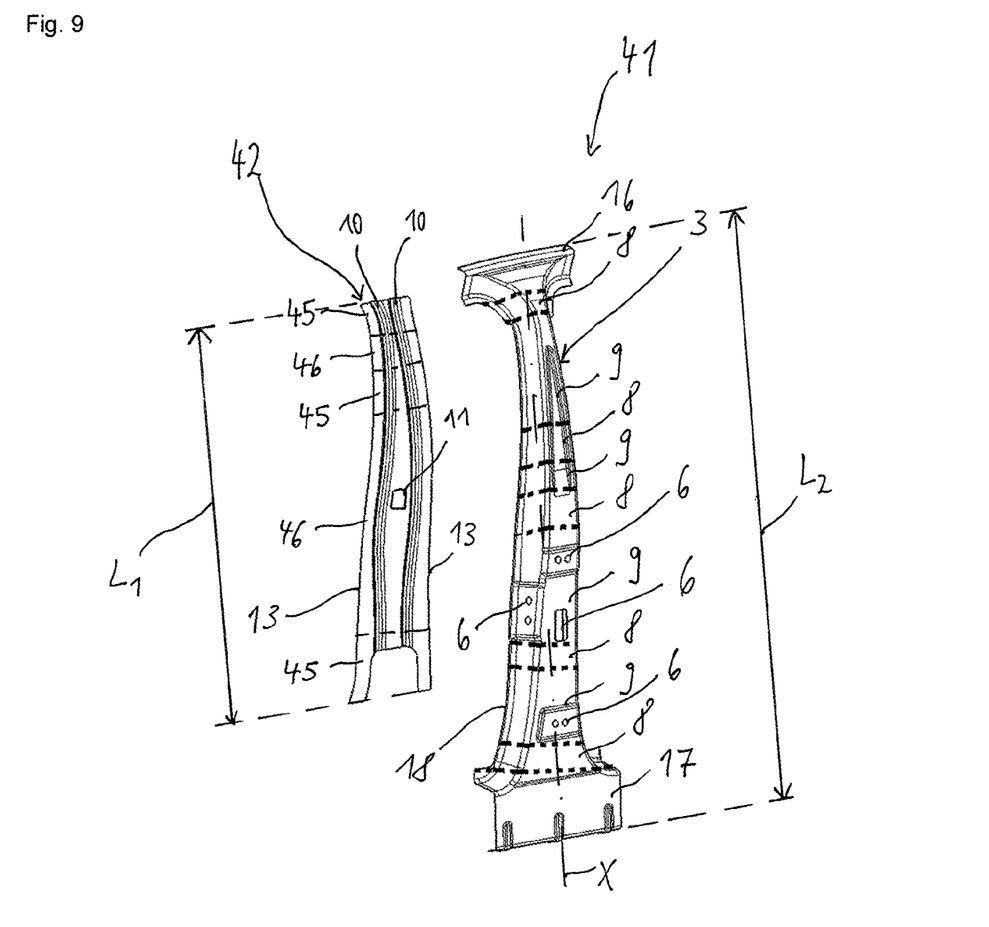
FIG. 9 illustrates a B-pillar according to a fourth embodiment in a perspective exploded view.

In FIG. 9 a vehicle pillar 41 according to a fourth embodiment of the present disclosure is shown in a perspective exploded view. Components which correspond to components of the first embodiment are provided with the same reference numerals as in FIGS. 1 to 4.

The vehicle pillar 41 according to the fourth embodiment differs from the vehicle pillar 1 according to the first embodiment only in an alternative closing panel 42, which according to the fourth embodiment has a variable thickness along the longitudinal extension $L_1$.

For manufacturing the cold formed closing panel 42, initially a strip material is flexibly rolled and then is provided with a zinc coating. The flexibly rolled steel sheet is also referred to as a "Tailor Rolled Blank". From this strip material a first blank is worked, so that the first blank has a variable thickness along its longitudinal extension. Then, the first blank is cold formed. It is also possible that the first blank is soft-annealed as an intermediate step, before this is cold-formed.

After the forming process, the cold-formed closing panel 42 has several partial portions 45, 46 of different sheet thickness over the longitudinal direction X. Said portions 45, 46 are indicated by dashed lines in FIG. 9. In practice, the reinforced partial portions 45 have a larger sheet thickness than the thin partial portions 46. Several thicker partial portions 45 and thinner partial portions are provided. Between each thick partial portion 45 and an adjoining thinner partial portion 46, transitional portions are also provided, in which a continuous sheet thickness transition from one partial portion with a thicker sheet, to a partial portion with a thinner sheet, takes place. For example, the closing panel 42 can have a reinforced partial portion 45 at an upper longitudinal end to provide a reinforced area in the area of a receptacle of a seat belt for passengers of the motor vehicle.

The hardened second formed part 3 also has several partial portions 8, 9 of varying sheet thickness in longitudinal direction X, which are indicated analogously to FIGS. 1 and 2 by dashed lines. The different sheet thicknesses of the closing panel 42 do not correspond to the varying sheet thicknesses of the second formed part 3. Due to the narrow connection portions 7 the two formed parts 3, 42 can still be connected well to each other along the connection edge 18 by high energy beam welding.

A structural component, e.g., for a motor vehicle body comprises a cold-formed first formed part and a warm-formed and hardened second formed part with a variable thickness along a longitudinal extension $L_2$ of the second formed part. The second formed part has a connection portion for connection to the first formed part, wherein the connection portion is distanced from an outer edge of the first formed part such that the structural component has a one-layered flange portion of the first formed part; between the connection portion and the outer edge. The first formed part and the second formed part are connected to each other by a high energy beam welding seam along a connection edge of the connection portion.

The invention claimed is:

1. A structural component, comprising:
   a cold-formed first formed part; and
   a warm-formed, and hardened, second formed part with a variable thickness along a longitudinal extension of the second formed part;
   wherein the second formed part has a connection portion connected to the first formed part, wherein the connection portion is distanced from an outer edge of the first formed part such that the structural component has a one-layered flange portion of the first formed part between the connection portion and the outer edge, wherein the one-layered flange portion is configured as a welding flange for being welded to a further component, and
   wherein the first formed part and the second formed part are connected to each other by a high energy beam welding seam along a connection edge of the connection portion.

2. The structural component according of claim 1, wherein the flange portion has a transversal extension of more than 20 millimeters along at least 50% of a longitudinal extension of the first formed part.

3. The structural component according of claim 1, wherein the flange portion extends along at least 50% of the longitudinal extension of the first formed part.

4. The structural component according of claim 1, wherein the high energy beam welding seam is formed continuously along at least 50% of an edge length of the connection edge of the connection portion.

5. The structural component according of claim 1, wherein the connection portion has a width of less than 10 millimeters.

6. The structural component according of claim 1, wherein the connection portion and the first formed part enclose an angle of 1° to 90°.

7. The structural component according of claim 1, wherein the connection portion is provided in form of a tab that engages in a slot formed in the first formed part.

8. The structural component according of claim 7, comprising a further connection portion being provided as a further tab that engages in a further slot formed in the first formed part, wherein the connection portion and the further connection portion are welded to the first formed part, wherein between the connection portion and the further connection portion a non-welded intermediate portion is formed.

9. The structural component according of claim 1, wherein the second formed part is narrower than the first formed part along at least 80% of a longitudinal extension of the first formed part.

10. The structural component according of claim 1, wherein the first formed part has a variable thickness along the longitudinal extension.

11. The structural component according of claim 1, wherein the structural component is a vehicle pillar of a motor vehicle, wherein the first formed part is a closing panel and the second formed part is an outer panel of the vehicle pillar.

* * * * *